UNITED STATES PATENT OFFICE.

WILLIAM W. UNDERHILL, OF BROOKLYN, NEW YORK.

ART OF MANUFACTURING STARCH.

SPECIFICATION forming part of Letters Patent No. 294,531, dated March 4, 1884.

Application filed January 9, 1884. (No specimens.)

*To all whom it may concern:*

Be it known that I, WILLIAM W. UNDERHILL, of the city of Brooklyn, in the county of Kings and State of New York, a citizen of the United States, have invented a new and useful Improvement in the Art of Manufacturing Starch, of which the following is a specification.

This invention relates to the employment of sulphurous acid for the purpose of preventing or arresting fermentation during the manufacture of starch. In an application for United States Letters Patent, No. 116,236, filed January 2, 1884, I have described and claimed the use of this acid for the same purpose, by introducing it into the "starch-water" after the separation of the latter, by sieving, from the bran and coarser parts of the grain, and before the separation of starch from the said liquor by subsidence. The same acid may also be used with advantage as an antiseptic at a later stage in the process; and this invention consists in its use after the separation by subsidence of the starch, or a large portion of it, from the starch-water, and applied either to the "tailings" or water from which the starch has been separated, or to the starch itself, as hereinafter described.

In carrying out this invention, I proceed according to the usual method of manufacturing starch—that is to say, I first soak the grain in water, then grind it in mills with water, then run the ground pulpy mass onto vibrating sieves, or into rotary sieves, for the purpose of separating from it the bran, husks, and coarser parts of the grain, and catch or collect in vats what is termed the "starch-water" or "starch-liquor," being that which passes through the sieves, and which contains nearly all the starch of the grain and some gluten and other matters. I afterward run this starch-water or starch-liquor over what are known as starch "planes" or "tables," for the purpose of collecting on said tables, by subsidence, the starch from said water or liquor; or else I obtain the starch from the said starch-water or starch-liquor by subsidence and decantation in cisterns. That portion of the starch-water which passes over the planes or tables after yielding up most of the starch which it first contained, or that portion which remains after subsidence and decantation in cisterns, known as "tailings," consists of water, some of the finer parts of the grain, and glutinous matter holding some starch entangled therewith. In order to arrest any fermentation which may have commenced at the time of dividing the starch from the tailings either by means of the planes or the cisterns, and to prevent any fermentation after this time, I now treat the said tailings with sulphurous acid, preparatory to their further treatment for obtaining the starch still remaining therein, and, if desirable, I also treat with sulphurous acid the starch itself already obtained from the starch-water, as hereinabove mentioned. For this treatment of the tailings I first bring them to a density of from 3° to 6° Baumé, or thereabout, and then introduce the sulphurous acid thereinto in small quantities or gradually, the water being kept stirred in the meantime, until a decided acid reaction is indicated by any of the usual tests, and I continue the stirring for from one to two hours or more. I then run the so treated tailings over the planes or tables again, or else submit them to subsidence and decantation in vats or cisterns, for the purpose of obtaining the starch remaining therein. This treatment with acid may be performed in any suitable vessel, and by the aid of any suitable stirring devices; but I prefer to perform it in a vessel provided with a rotary shaft and attached stirring arms or blades. To treat the starch itself which was obtained by the first running of the starch-water over the planes, or by subsidence and decantation in cisterns, I add to it a sufficient quantity of water to obtain a liquor of a density of 3° to 6° Baumé, or thereabout, and then, as hereinbefore described with reference to the tailings, add to and stir with it the requisite quantity of acid to produce an acid reaction. This liquor, after this treatment with sulphurous acid, will require to be run again over the starch-planes, or subjected to subsidence and decantation in cisterns, to obtain the starch contained therein. This starch and the starch obtained from the tailings, after treatment with sulphurous acid in the manner described, may be subjected to such further treatment as is desirable—as, for instance, any treatment which is commonly practiced in the finishing of starch after it has been obtained by subsidence from the water with which it came from the sieves on which the bran and coarse matters of the grain had been separated.

The treatment with sulphurous acid at the stage herein indicated differs from that which is the subject of my previously-filed application for patent, hereinbefore referred to, in its being postponed to a later stage in the process of the manufacture; and I will here state that there is economy in the postponement of the use of the acid to as late a stage of the process as the tendency to fermentation develops or is likely to develop, as at the later stage there is less material to be operated upon.

What I claim as my invention, and desire to secure by Letters Patent, is—

1. The improvement in the art of manufacturing starch, consisting in the antiseptic treatment, with sulphurous acid, as herein described, of the tailings or water from which starch has been obtained by subsidence.

2. The improvement in the art of manufacturing starch, consisting in the addition to starch which has been collected from the starch-water by subsidence of sufficient water to bring it to a proper density, then adding and stirring with it sufficient sulphurous acid to produce an acid reaction, and afterward separating the starch from the water by subsidence, substantially as herein described.

WILLIAM W. UNDERHILL.

Witnesses:
FREDK. HAYNES,
MAT POLLOCK.